(12) United States Patent
Scherzer et al.

(10) Patent No.: US 8,362,122 B2
(45) Date of Patent: *Jan. 29, 2013

(54) FLOWABLE POLYESTERS WITH CARBODIIMIDE STABILIZERS

(75) Inventors: Dietrich Scherzer, Neustadt (DE); Bernd Bruchmann, Freinsheim (DE); Andreas Eipper, Ludwigshafen (DE); Karl Häberle, Speyer (DE); Carsten Weiss, Singapore (SG); Michaela Liese, Ludwigshafen (DE); Mark Völkel, Ladenburg (DE)

(73) Assignee: BASF SE, Ludwigshafen (DE)

( * ) Notice: Subject to any disclaimer, the term of this patent is extended or adjusted under 35 U.S.C. 154(b) by 245 days.

This patent is subject to a terminal disclaimer.

(21) Appl. No.: 11/815,238

(22) PCT Filed: Feb. 1, 2006

(86) PCT No.: PCT/EP2006/050590
§ 371 (c)(1),
(2), (4) Date: Aug. 1, 2007

(87) PCT Pub. No.: WO2006/082201
PCT Pub. Date: Aug. 10, 2006

(65) Prior Publication Data
US 2008/0139715 A1 Jun. 12, 2008

(30) Foreign Application Priority Data
Feb. 1, 2005 (DE) .................. 10 2005 004 856

(51) Int. Cl.
*C08G 18/28* (2006.01)
(52) U.S. Cl. ........ 524/195; 524/409; 524/100; 524/126; 524/133; 524/147; 252/601
(58) Field of Classification Search ............ 524/195
See application file for complete search history.

(56) References Cited

U.S. PATENT DOCUMENTS

| | | | |
|---|---|---|---|
| 3,305,605 A | 2/1967 | Hostettler et al. | |
| 3,479,314 A | 11/1969 | Williams | |
| 3,491,048 A | 1/1970 | Sargent | |
| 4,002,581 A | 1/1977 | Dolce | |
| 4,014,935 A * | 3/1977 | Ibbotson | 540/202 |
| 4,164,114 A | 8/1979 | Yabuki et al. | |
| 4,239,677 A | 12/1980 | Dieck | |
| 4,351,916 A | 9/1982 | Kohan | |
| 4,396,742 A | 8/1983 | Binsack et al. | |
| 4,771,109 A | 9/1988 | Eichenauer et al. | |
| 4,873,289 A | 10/1989 | Linder et al. | |
| 4,882,381 A | 11/1989 | Wittman et al. | |
| 5,010,135 A | 4/1991 | Eckel et al. | |
| 5,136,014 A | 8/1992 | Figuly | |
| 5,144,005 A | 9/1992 | Sextro et al. | |
| 5,157,076 A | 10/1992 | Greenlee et al. | |
| 5,246,993 A * | 9/1993 | Scherzer et al. | 524/195 |
| 5,250,595 A | 10/1993 | Miyashita et al. | |
| 5,314,949 A | 5/1994 | Kozakura et al. | |
| 5,348,699 A | 9/1994 | Meyer et al. | |
| 5,399,620 A | 3/1995 | Niessner et al. | |
| 5,480,944 A | 1/1996 | Aharoni | |
| 5,496,887 A | 3/1996 | Braune | |
| 5,608,030 A | 3/1997 | Hoffmockel et al. | |
| 5,621,031 A | 4/1997 | Leimann et al. | |
| 5,712,336 A | 1/1998 | Gareiss et al. | |
| 5,733,959 A * | 3/1998 | Heitz et al. | 524/195 |
| 5,844,059 A | 12/1998 | Yamamoto et al. | |
| 5,998,565 A | 12/1999 | de Brabander-van den Berg et al. | |
| 6,037,444 A | 3/2000 | Rannard et al. | |
| 6,087,449 A | 7/2000 | Tiefensee et al. | |
| 6,225,404 B1 | 5/2001 | Sorensen et al. | |
| 6,232,435 B1 | 5/2001 | Heitz et al. | |
| 6,252,025 B1 | 6/2001 | Wang et al. | |
| 6,262,185 B1 | 7/2001 | Heitz et al. | |
| 6,300,424 B1 | 10/2001 | Frechet et al. | |
| 6,497,959 B1 | 12/2002 | Mhetar | |
| 6,528,612 B1 * | 3/2003 | Brenner et al. | 528/271 |
| 6,541,599 B1 | 4/2003 | Wang | |
| 6,894,112 B1 | 5/2005 | Weber et al. | |
| 7,081,509 B2 | 7/2006 | Wagner et al. | |
| 2002/0120076 A1 | 8/2002 | Schueler et al. | |
| 2002/0161113 A1 * | 10/2002 | Dvornic et al. | 525/100 |
| 2003/0018104 A1 | 1/2003 | Mours et al. | |
| 2003/0069370 A1 | 4/2003 | Dvornic et al. | |
| 2003/0082384 A1 | 5/2003 | Mhetar | |

(Continued)

FOREIGN PATENT DOCUMENTS

| | | |
|---|---|---|
| BE | 702357 | 2/1968 |
| BE | 720658 | 11/1969 |

(Continued)

OTHER PUBLICATIONS

S. Rannard, et al. "A Highly Selective, one-Pot Multiple-Addition Convergent Synthesis of Polycarbonate Dendrimers", J. Am. Chem. Soc. 2000, 122, 11729-11730.

(Continued)

*Primary Examiner* — Doris Lee
(74) *Attorney, Agent, or Firm* — Connolly Bove Lodge & Hutz LLP

(57) ABSTRACT

Thermoplastic molding compositions comprising

A) from 10 to 98.9% by weight of at least one thermoplastic polyester,

B) from 0.01 to 50% by weight of

B1) at least one highly branched or hyperbranched polycarbonate having an OH number of from 1 to 600 mg KOH/g of polycarbonate (to DIN 53240, part 2), or B2) at least one highly branched or hyperbranched polyester of the $A_xB_y$ type where x is at least 1.1 and y is at least 2.1 or mixtures thereof

C) from 0.1 to 10% by weight of at least one carbodiimide,

D) from 0 to 60% by weight of further additives, the sum of the percentages by weight of components A) to D) adding up to 100%.

15 Claims, No Drawings

U.S. PATENT DOCUMENTS

| | | |
|---|---|---|
| 2003/0171503 A1 | 9/2003 | Adedeji |
| 2004/0138388 A1 | 7/2004 | Pecorini et al. |
| 2004/0192857 A1 | 9/2004 | Borer et al. |
| 2004/0220374 A1 | 11/2004 | Heuer et al. |
| 2005/0025091 A1 | 2/2005 | Patel et al. |
| 2005/0054812 A1 | 3/2005 | Wagner et al. |
| 2005/0124779 A1 | 6/2005 | Shelby et al. |
| 2005/0165177 A1 | 7/2005 | Wagner et al. |
| 2006/0142442 A1 | 6/2006 | Scherzer et al. |
| 2008/0015303 A1 | 1/2008 | Eibeck et al. |

FOREIGN PATENT DOCUMENTS

| | | |
|---|---|---|
| CA | 2019904 | 1/1991 |
| CA | 733567 | 5/1996 |
| CA | 2256343 | 12/1997 |
| CA | 2554037 | 8/2005 |
| CA | 2554038 | 8/2005 |
| DE | 222868 | 6/1910 |
| DE | 3725576 | 2/1989 |
| DE | 3800603 | 7/1989 |
| DE | 4307392 | 4/1994 |
| DE | 4328004 | 2/1995 |
| DE | 19953950 | 5/2001 |
| DE | 10132928 | 1/2003 |
| DE | 10136911 | 2/2003 |
| DE | 10147712 | 4/2003 |
| DE | 10163163 | 7/2003 |
| DE | 10240817 | 3/2004 |
| DE | 10251294 | 5/2004 |
| DE | 10304341 | 8/2004 |
| DE | 102004005652 | 8/2005 |
| DE | 102004005657 | 8/2005 |
| DE | 102004057867 | 6/2006 |
| DE | 102005012482 | 9/2006 |
| EP | 0050265 | 4/1982 |
| EP | 0047529 | 6/1985 |
| EP | 0208187 | 1/1987 |
| EP | 0235690 | 9/1987 |
| EP | 0319290 | 6/1989 |
| EP | 0410301 | 1/1991 |
| EP | 0484737 | 5/1992 |
| EP | 0545184 | 6/1993 |
| EP | 0629644 | 12/1994 |
| EP | 0682057 | 11/1995 |
| EP | 0736571 | 10/1996 |
| EP | 1099727 | 5/2001 |
| EP | 1207172 | 5/2002 |
| EP | 1344794 | 9/2003 |
| EP | 1424360 | 6/2004 |
| EP | 1424362 | 6/2004 |
| FR | 2833603 | 6/2003 |
| FR | 2833604 | 6/2003 |
| FR | 2 856 693 | 12/2004 |
| GB | 1458561 | 12/1976 |
| GB | 1558308 | 12/1979 |
| GB | 2324797 | 11/1998 |
| JP | 4175366 | 6/1992 |
| JP | 2006/100758 | 9/1992 |
| JP | 06157880 | 11/1992 |
| JP | 08269306 | 3/1995 |
| JP | 09157503 | 12/1995 |
| JP | 11060663 A | 3/1999 |
| JP | 11255853 A | 9/1999 |
| JP | 11279245 A | 10/1999 |
| SU | 519449 | 6/1976 |
| WO | WO-96/11962 | 4/1996 |
| WO | WO-97/05705 | 2/1997 |
| WO | WO-97/08241 | 3/1997 |
| WO | WO-97/45474 | 12/1997 |
| WO | WO-98/50453 | 11/1998 |
| WO | WO-2005/058385 | 10/2000 |
| WO | WO-02/32982 | 4/2002 |
| WO | WO-03/064502 | 8/2003 |
| WO | 03093343 | 11/2003 |
| WO | WO-03/093343 A1 | 11/2003 |
| WO | WO-2004/087785 | 10/2004 |
| WO | WO-2004/111126 | 12/2004 |
| WO | WO-2005/012380 A | 2/2005 |
| WO | WO-2005/075563 | 8/2005 |
| WO | WO-2005/075565 | 8/2005 |
| WO | WO-2003/004546 | 1/2006 |
| WO | WO-2006/018127 | 2/2006 |
| WO | WO-2006/018128 | 2/2006 |
| WO | WO-2006/018179 | 2/2006 |
| WO | WO-2006/040066 | 4/2006 |
| WO | WO-2006/040101 | 4/2006 |
| WO | WO-2006/042673 | 4/2006 |
| WO | WO-2006/048247 | 5/2006 |
| WO | WO-2006/134115 | 12/2006 |
| WO | WO-2007/009929 | 12/2006 |
| WO | WO-2007/009930 | 1/2007 |
| WO | WO-2008/074687 | 6/2008 |

OTHER PUBLICATIONS

D. Bolton, et al., "Synthesis and Characterization of Hyperbranched Polycarbonates", *Macromolecules* 1997, 30, 1890-1896.

K. Pochner, et al., Treatment of Polymers for subsequent metallization using intense UV radiation or plasma at atmospheric pressure, 1997, 372-377, Surface and Coatings Technology 97.

A. Weber, et al., Metallization of Polymers Using Plasma-Enhanced Chemical Vapor Deposited Titanium Nitride as Interlayer, Mar. 1997, 1131-1135, Journal of the Electrochemical Society, vol. 14, No. 3.

H. Horn, et al., Excimer laser pretreatment and metallization of polymers, 1999, 270-284, Nuclear Instruments and Methods in Physics Research B151.

Massa, et al., "Novel Blends of Hyperbranched Polyesters and Linear polymers", *Macromolecules* (1995), pp. 3214-3220, vol. 28, No. 9.

Gorda, et al., "Star Shaped Condensation Polymers: Synthesis, Characterization, and Blend Properties", Journal of Applied Polymer Science (1993), pp. 1977-1983, vol. 50.

Sunder, et al., "Synthesis and Thermal Behaviour of Esterfied Alipghatic Hyperbranched Polyether Polyols", *Macromolecules* (2000), pp. 1330-1337, vol. 33.

Jang, Jyongsik, et al., "Crystallization Behaviour of Poly (ethylene terephthalate) Blended with Hyberbranched Polmers: The Effect of Terminal Groups and Composition of Hyperbranched Polymers". *Macromolecules*, 2000, 33, 1864-1870, XP-001079109.

P. Carr, et al., "Dielectric and mechanical characterization of aryl ester dendrimer/PET blends", Polymer, vol. 37, No. 12, 1996, pp. 2395-2401.

Lin, et al., "Polymerization of $A_2$ with $B_3$ Monomers: A Facile Approach to Hyperbranched Poly(aryl ester)s", *Macromolecules*, No. 36, 2003, pp. 9809-9816.

Luman, et al., "The Convergent Synthesis of Poly(glycerol-succinic acid) Dendritic macromolecules", Chem. Eur. J., No. 9, 2003, pp. 5618-5626.

Dr. S. Anders, et al., "Polycarbonate Polyacetate Polyester Celluloseester", Carl Hanser Verlag, 1992, pp. 118-119.

International Preliminary Report on Patentability for International Application No. PCT/EP2006/063167, issued Jan. 16, 2008.

International Preliminary Report on Patentability for International Application No. PCT/EP2006/063167, issued Dec. 17, 2007.

International Preliminary Report on Patentability for International Application No. PCT/EP2006/064182, issued Jan. 22, 2008.

International Preliminary Report on Patentability for International Application No. PCT/EP2006/064182, issued Feb. 5, 2008.

International Preliminary Report on Patentability for International Application No. PCT/EP2006/064180, issued Feb. 5, 2008.

International Preliminary Report on Patentability for International Application No. PCT/EP2006/064180, issued Jan. 22, 2008.

International Preliminary Report on Patentability for International Application No. PCT/EP2005/011704, issued May 22, 2007.

International Preliminary Report on Patentability for International Application No. PCT/EP2005/010854, issued Nov. 6, 2006.

International Preliminary Report on Patentability for International Application No. PCT/EP2005/001015, issued May 8, 2006.

International Preliminary Report on Patentability for International Application No. PCT/EP2005/010762, issued Apr. 24, 2007.

International Preliminary Report on Patentability for International Application No. PCT/EP2005/008339, issued Aug. 11, 2006.

* cited by examiner

FLOWABLE POLYESTERS WITH CARBODIIMIDE STABILIZERS

CROSS REFERENCE TO RELATED APPLICATIONS

This application is a National Phase of International Application No. PCT/EP2006/050590 filed on Feb. 1, 2006, which claims priority to Application No. 102005004856.0 filed in Germany on Feb. 1, 2005 under 35 U.S.C. §119; the entire contents of all are hereby incorporated by reference.

The invention relates to thermoplastic molding compositions comprising
A) from 10 to 98.9% by weight of at least one thermoplastic polyester,
B) from 0.01 to 50% by weight of
B1) at least one highly branched or hyperbranched polycarbonate having an OH number of from 1 to 600 mg KOH/g of polycarbonate (to DIN 53240, part 2), or
B2) at least one highly branched or hyperbranched polyester of the $A_xB_y$ type where x is at least 1.1 and y is at least 2.1 or mixtures thereof
C) from 0.1 to 10% by weight of at least one carbodiimide,
D) from 0 to 60% by weight of further additives,
the sum of the percentages by weight of components A) to D) adding up to 100%.

The invention further relates to the use of the inventive molding compositions for producing fibers, films and moldings, and also to the moldings of any type obtainable in this way.

Carbodiimides as stabilizers are known; see, for example, DE-A-10 351 534.8.

To improve the flowability, low molecular weight additives are typically added to thermoplastics. However, the action of such additives is highly restricted, since, for example, the decline in the mechanical properties is no longer tolerable when the amount of the additive added is increased.

Dendritic polymers having a perfectly symmetrical structure, known as dendrimers, can be prepared starting from one central molecule via controlled stepwise linkage of in each case two or more di- or polyfunctional monomers to each previously bonded monomer. Each linkage step exponentially increases the number of monomer end groups (and therefore of linkages), and this gives polymers with treelike structures, in the ideal case spherical, the branches of which comprise exactly the same number of monomer units. Owing to this perfect structure, the polymer properties are advantageous: for example, surprisingly low viscosity is found, as is high reactivity owing to the large number of functional groups on the surface of the sphere. However, the preparation is complicated by the fact that protecting groups have to be introduced and removed again in each linkage step, and purification operations are required, which is why dendrimers are typically prepared only on the laboratory scale.

However, highly branched or hyperbranched polymers can be prepared in a simple manner using industrial scale processes. In addition to perfect dendritic structures, they also have linear polymer chains and unequal polymer branches, which often does not, however, substantially impair the polymer properties in comparison to perfect dendrimers. Hyperbranched polymers can be prepared via two synthetic routes known as $AB_2$ and $A_x+B_y$. Here, $A_x$ and $B_y$ are different monomers and the indices x and y are the number of functional groups present in A and B respectively, i.e. the functionality of A and B respectively. In the $AB_2$ route, a trifunctional monomer having a reactive group A and having two reactive groups B is converted to a highly branched or hyperbranched polymer. In the $A_x$ and $B_y$ synthesis, illustrated using the example of the $A_2+B_3$ synthesis, a difunctional monomer $A_2$ is reacted with a trifunctional monomer $B_3$. This first gives a 1:1 adduct of A and B having an average of one functional group A and two functional groups B, which can then likewise react to give a highly branched or hyperbranched polymer.

WO-97/45474 discloses thermoplastic compositions which comprise dendrimeric polyesters as the $AB_2$ molecule. In this case, a polyhydric alcohol as core molecule reacts with dimethylolpropionic acid as the $AB_2$ molecule to give a dendrimeric polyester. This comprises only OH functions at the end of the chain. Disadvantages of these mixtures are high glass transition temperature of the dendrimeric polyesters, the comparatively complicated preparation, and in particular poor solubility of the dendrimers in the polyester matrix.

According to the teaching of DE-A 101 32 928, the incorporation of branching agents of this type by means of compounding and solid-phase postcondensation leads to an improvement in mechanical properties (molecular weight increase). The disadvantages of the process variant described are long preparation time and the disadvantageous properties listed above.

DE 102004 005652.8 and DE 102004 005657.9 have previously proposed novel additives for flow improvement in polyesters.

It was therefore an object of the present invention to provide thermoplastic polyester molding compositions which have good flowability and simultaneously good mechanical properties. In particular, the additive (or the additive combination) should not have a tendency to exudation or to mold deposition.

As component (A), the inventive molding compositions comprise from 10 to 98.9% by weight, preferably from 30 to 97% by weight and in particular from 30 to 95% by weight, of at least one thermoplastic polyester.

In general, polyesters A) based on aromatic dicarboxylic acids and an aliphatic or aromatic dihydroxyl compounds are used.

A first group of preferred polyesters is that of polyalkylene terephthalates, in particular those having from 2 to 10 carbon atoms in the alcohol moiety.

Such polyalkylene terephthalates are known per se and are described in the literature. Their main chain comprises an aromatic ring which stems from the aromatic dicarboxylic acid. The aromatic ring may also be substituted, for example by halogen, such as chlorine or bromine, or by $C_1$-$C_4$-alkyl groups such as methyl, ethyl, iso- or n-propyl, or n-, iso- or tert-butyl groups.

These polyalkylene terephthalates may be prepared by reacting aromatic dicarboxylic acids, their esters or other ester-forming derivatives with aliphatic dihydroxyl compounds in a manner known per se.

Preferred dicarboxylic acids include 2,6-naphthalenedicarboxylic acid, terephthalic acid and isophthalic acid, or mixtures thereof. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Of the aliphatic dihydroxyl compounds, preference is given to diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, or mixtures thereof.

Particularly preferred polyesters (A) include polyalkylene terephthalates which derive from alkanediols having from 2 to 6 carbon atoms. Of these, preference is given in particular to polyethylene terephthalate, polypropylene terephthalate and polybutylene terephthalate, or mixtures thereof. Preference is further given to PET and/or PBT which comprise, as further monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 (measured in 0.5% by weight solution in a phenol/o-dichlorobenzene mixture in a weight ratio of 1:1 at 25° C.) to ISO 1628.

Preference is given in particular to polyesters whose carboxyl end group content is up to 100 meq/kg of polyester, preferably up to 50 meq/kg of polyester and in particular up to 40 meq/kg of polyester. Such polyesters may be prepared, for example, by the process of DE-A 44 01 055. The carboxyl end group content is typically determined by titration methods (e.g. potentiometry).

Especially preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use PET recyclates (also known as scrap PET), if appropriate in a mixture with polyalkylene terephthalates such as PBT.

Recyclates are generally:
1) those known as post-industrial recyclates: these are production wastes in polycondensation or in processing, for example sprues from injection molding, start-up material from injection molding or extrusion, or edge trims from extruded sheets or films.
2) post-consumer recyclates: these are plastic items which are collected and processed after utilization by the end consumer. In terms of volume, blow-molded PET bottles for mineral water, soft drinks and juices are easily the predominant items.

Both types of recyclate may be used either as ground material or in the form of granules. In the latter case, the crude recyclates, after being separated and purified, are melted and granulated using an extruder. This usually eases the handling and the free flow and the metering for further processing steps.

The recyclates used may either be granulated or in the form of regrind. The edge length should not be more than 10 mm, preferably less than 8 mm.

Owing to the hydrolytic cleavage of polyesters in the course of processing (as a result of traces of moisture), it is advisable to predry the recyclate. The residual moisture content after drying is preferably <0.2%, in particular <0.05%.

Another group to be mentioned is that of fully aromatic polyesters which derive from aromatic dicarboxylic acids and aromatic dihydroxyl compounds.

Suitable aromatic dicarboxylic acids are the compounds already mentioned for the polyalkylene terephthalates. Preference is given to using mixtures of from 5 to 100 mol % of isophthalic acid and from 0 to 95 mol % of terephthalic acid, in particular mixtures of about 80% terephthalic acid with 20% isophthalic acid up to about equivalent mixtures of these two acids.

The aromatic dihydroxyl compounds preferably have the general formula

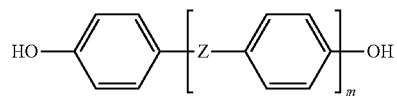

in which Z is alkylene or cycloalkylene having up to 8 carbon atoms, arylene having up to 12 carbon atoms, a carbonyl group, a sulfonyl group, an oxygen or sulfur atom, or a chemical bond, and in which m is from 0 to 2. The compounds may also bear $C_1$-$C_6$-alkyl or alkoxy groups and fluorine, chlorine or bromine as substituents on the phenylene groups.

Examples of parent compounds for these compounds are
dihydroxybiphenyl,
di(hydroxyphenyl)alkane,
di(hydroxyphenyl)cycloalkane,
di(hydroxyphenyl) sulfide,
di(hydroxyphenyl)ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene,
resorcinol, and
hydroquinone, and also their ring-alkylated and ring-halogenated derivatives.

Of these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
or mixtures thereof.

It is of course also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is of course also possible to use polyester block copolymers, such as copolyether-esters. Such products are known per se and are described in the literature, for example in U.S. Pat. No. 3,651,014. Corresponding products are also available commercially, for example Hytrel® (DuPont).

According to the invention, polyesters also include halogen-free polycarbonates. Examples of suitable halogen-free polycarbonates are those based on diphenols of the formula

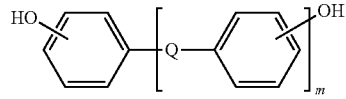

in which Q is a single bond, a $C_1$-$C_8$-alkylene, $C_2$-$C_3$-alkylidene, $C_3$-$C_6$-cycloalkylidene group, a $C_6$-$C_{12}$-arylene group, or else —O—, —S— or —$SO_2$—, and m is an integer from 0 to 2.

The diphenols may also have substituents on the phenylene radicals, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

The suitable polycarbonates may be branched in a known manner, preferably by incorporating 0.05 to 2.0 mol %, based on the sum of the biphenols used, of at least trifunctional compounds, for example those having three or more phenolic OH groups.

Particularly suitable polycarbonates have been found to be those which have relative viscosities $\eta_{rel}$ of from 1.10 to 1.50, in particular from 1.25 to 1.40. This corresponds to average molecular weights $M_w$ (weight-average) of from 10 000 to 200 000 g/mol, preferably from 20 000 to 80 000 g/mol.

The diphenols of the general formula are known per se or can be prepared by known processes.

The polycarbonates can be prepared, for example, by reacting the diphenols with phosgene in the interfacial process, or with phosgene in the homogeneous-phase process (known as the pyridine process), and in each case the desired molecular weight is achieved in a known manner by means of an appropriate amount of known chain terminators. (In relation to polydiorganosiloxane-comprising polycarbonates see, for example, DE-A 33 34 782.)

Examples of suitable chain terminators are phenol, p-tert-butylphenol, or else long-chain alkylphenols such as 4-(1,3-tetramethylbutyl)phenol as in DE-A 28 42 005, or monoalkylphenols, or dialkylphenols with a total of from 8 to 20 carbon atoms in the alkyl substituents as in DE-A-35 06 472, such as p-nonylphenyl, 3,5-di-tert-butylphenol, p-tert-octylphenol, p-dodecylphenol, 2-(3,5-dimethylheptyl)phenol and 4-(3,5-dimethyl-heptyl)phenol.

In the context of the present invention, halogen-free polycarbonates are poly-carbonates made from halogen-free biphenols, halogen-free chain terminators and, if appropriate, halogen-free branching agents. The content of subordinate amounts of the ppm level of hydrolyzable chlorine, resulting, for example, from the preparation of the polycarbonates with phosgene in the interfacial process, is not regarded as meriting the term halogen-containing in the context of the invention. Such polycarbonates with contents of hydrolyzable chlorine at the ppm level are halogen-free polycarbonates in the context of the present invention.

Further suitable components A) include are amorphous polyester carbonates, for which phosgene has been replaced by aromatic dicarboxylic acid units such as isophthalic acid and/or terephthalic acid units in the preparation. For further details, reference may be made at this point to EP-A 711 810.

Further suitable copolycarbonates having cycloalkyl radicals as monomer units are described in EP-A 365 916.

It is also possible for bisphenol A to be replaced by bisphenol TMC. Such polycarbonates are obtainable from Bayer with the trademark APEC HT®.

As component B), the inventive molding compositions comprise from 0.01 to 50% by weight, preferably from 0.5 to 20% by weight and in particular from 0.7 to 10% by weight, of B1) at least one highly branched or hyperbranched polycarbonate having an OH number of from 1 to 600 mg KOH/g of polycarbonate, preferably from 10 to 550 mg KOH/g of polycarbonate and in particular from 50 to 550 mg KOH/g of polycarbonate (to DIN 53240, part 2), or of at least one hyperbranched polyester as component B2) or mixtures thereof as described below.

In the context of this invention, hyperbranched polycarbonates B1) are uncrosslinked macromolecules having hydroxyl groups and carbonate groups which have both structural and molecular non-uniformity. One possible structure is based on a central molecule in the same way as dendrimers, but with non-uniform chain length of the branches. Another possibility is a linear structure with functional pendant groups, or else a combination of the two extremes, with linear and branched molecular portions. See also P. J. Flory, J. Am. Chem. Soc. 1952, 74, 2718, and H. Frey et al., Chem. Eur. J. 2000, 6, No. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, more preferably from 20 to 95%.

"Dendrimeric" in the context of the present invention means that the degree of branching is from 99.9 to 100%. See H. Frey et al., Acta Polym. 1997, 48, 30 for the definition of "degree of branching".

The degree of branching (DB) of the compounds in question is defined as $$DB = \frac{T+Z}{T+Z+L} \times 100\%$$

(where T is the average number of terminal monomer units, Z the average number of branched monomer units and L the average number of linear monomer units in the macromolecules of the particular substances).

Component B1) preferably has a number-average molecular weight $M_n$ of from 100 to 15 000 g/mol, preferably from 200 to 12 000 g/mol and in particular from 500 to 10 000 g/mol (GPC, PMMA standard).

The glass transition temperature Tg is in particular from −80° C. to +140° C., preferably from −60 to 120° C. (by DSC, DIN 53765).

In particular, the viscosity (mPas) at 23° C. (to DIN 53019) is from 50 to 200 000, in particular from 100 to 150 000 and most preferably from 200 to 100 000.

Component B1) is preferably obtainable by a process which comprises at least the following steps:

a) reaction of at least one organic carbonate (A) of the general formula RO[(CO)]$_n$OR with at least one aliphatic, aliphatic/aromatic or aromatic alcohol (B) which has at least 3OH groups with elimination of alcohols ROH to give one or more condensation products (K) where R is in each case independently a straight-chain or branched aliphatic, araliphatic or aromatic hydrocarbon radical having from 1 to 20 carbon atoms, and where the R radicals may also be bonded together to form a ring and n is an integer from 1 to 5, or ab) reaction of phosgene, diphosgene or triphosgene with the above-mentioned alcohol (B) with hydrogen chloride elimination and b) intermolecular reaction of the condensation products (K) to give a highly functional highly branched or highly functional hyperbranched polycarbonate, the quantitative ratio of OH groups to the carbonates in the reaction mixture being selected in such a way that the condensation products (K) on average either have one carbonate group and more than one OH group or one OH group and more than one carbonate group.

The starting material used may be phosgene, diphosgene or triphosgene, preference being given to organic carbonates.

Each of the R radicals of the organic carbonates (A) used as a starting material and having the general formula RO(CO)OR is independently a straight-chain or branched aliphatic, araliphatic, or aromatic hydrocarbon radical having from 1 to 20 carbon atoms. The two R radicals may also be joined together to form a ring. The radical is preferably an aliphatic hydrocarbon radical and more preferably a straight-chain or branched alkyl radical having from 1 to 5 carbon atoms, or a substituted or unsubstituted phenyl radical.

In particular, simple carbonates of the formula RO(CO)$_n$OR are used; n is preferably from 1 to 3, in particular 1.

Dialkyl or diaryl carbonates may be prepared, for example, from the reaction of aliphatic, araliphatic or aromatic alcohols, preferably monoalcohols, with phosgene. They may also be prepared via oxidative carbonylation of the alcohols or phenols by means of CO in the presence of noble metals, oxygen, or $NO_x$. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic, araliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates in which n is greater than 1 comprise dialkyl dicarbonates such as di(t-butyl) dicarbonate, or dialkyl tricarbonates such as di(t-butyl) tricarbonate.

Preference is given to using aliphatic carbonates, in particular those in which the radicals comprise from 1 to 5 carbon atoms, for example dimethyl carbonate, diethyl carbonate, dipropyl carbonate, dibutyl carbonate or diisobutyl carbonate.

The organic carbonates are reacted with at least one aliphatic alcohol (B) which has at least 3 OH groups, or mixtures of two or more different alcohols.

Examples of compounds having at least three OH groups comprise glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol, polyglycerols, tris(hydroxymethyl) isocyanurate, tris(hydroxyethyl) isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethanel, bis(trimethylol-propane), or sugars, for example glucose, trihydric or higher polyhydric polyetherols based on trihydric or higher polyhydric alcohols and ethylene oxide, propylene oxide, or butylene oxide, or polyesterols. Particular preference is given to glycerol, trimethylolethane, trimethylolpropane, 1,2,4-butanetriol, pentaerythritol, and also their polyetherols based on ethylene oxide or propylene oxide.

These polyhydric alcohols may also be used in a mixture with dihydric alcohols (B'), with the proviso that the average total OH functionality of all of the alcohols used is greater than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)-ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxyphenyl, bis(4-bis-(hydroxyphenyl) sulfide, bis(4-hydroxyphenyl) sulfone, bis(hydroxymethyl)benzene, bis(hydroxymethyl)toluene, bis(p-hydroxyphenyl)methane, bis(p-hydroxyphenyl)-ethane, 2,2-bis(p-hydroxyphenyl)propane, 1,1-bis(p-hydroxyphenyl)cyclohexane, dihydroxybenzophenone, dihydric polyether polyols based on ethylene oxide, propylene oxide, butylene oxide, or a mixture of these, polytetrahydrofuran, polycaprolactone, or polyesterols based on diols and dicarboxylic acids.

The diols serve for fine adjustment of the properties of the polycarbonate. If dihydric alcohols are used, the ratio of dihydric alcohols B') to the at least trihydric alcohols (B) is set by the person skilled in the art as a function of the desired properties of the polycarbonate. The amount of the alcohol(s) (B') is generally from 0 to 39.9 mol %, based on the total amount of all alcohols (B) and (B'). The amount is preferably from 0 to 35 mol %, more preferably from 0 to 25 mol %, and most preferably from 0 to 10 mol %.

The reaction of phosgene, diphosgene, or triphosgene with the alcohol or alcohol mixture generally takes place with elimination of hydrogen chloride, and the reaction of the carbonates with the alcohol or alcohol mixture to give the inventive highly functional highly branched polycarbonate takes place with elimination of the monohydric alcohol or phenol from the carbonate molecule.

After the reaction, i.e. with no further modification, the highly functional highly branched polycarbonates formed by the inventive process are terminated by hydroxyl groups and/or by carbonate groups. They have good solubility in various solvents, for example in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

In the context of this invention, a highly functional polycarbonate is a product which, in addition to the carbonate groups which form the polymer skeleton, further has at least three, preferably at least six, more preferably at least ten, terminal or pendant functional groups. The functional groups are carbonate groups and/or OH groups. There is in principle no upper restriction on the number of the terminal or pendant functional groups, but products having a very high number of functional groups can have undesired properties, such as high viscosity or poor solubility. The highly functional polycarbonates of the present invention usually have not more than 500 terminal or pendant functional groups, preferably not more than 100 terminal or pendant functional groups.

In the preparation of the highly functional polycarbonates B1), it is necessary to adjust the ratio of the compounds comprising OH groups to phosgene or carbonate in such a way that the simplest resulting condensation product (hereinafter termed condensation product (K)) comprises an average of either one carbonate group or carbamoyl group and more than one OH group or one OH group and more than one carbonate group or carbamoyl group. The simplest structure of the condensation product (K) composed of a carbonate (A) and a di- or polyalcohol (B) gives rise to the $XY_n$ or $Y_nX$ arrangement where X is a carbonate group, Y is a hydroxyl group, and n is generally a number from 1 to 6, preferably from 1 to 4, more preferably from 1 to 3. The reactive group which is the single resulting group is generally referred to as "focal group" below.

For example, when the reaction ratio in the preparation of the simplest condensation product (K) from a carbonate and a dihydric alcohol is 1:1, the average result is a molecule of XY type, illustrated by the general formula 1.

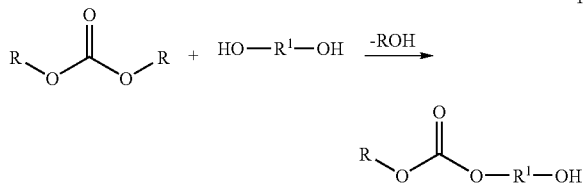

In the preparation of the condensation product (K) from a carbonate and a trihydric alcohol with a reaction ratio of 1:1, the average result is a molecule of $XY_2$ type, illustrated by the general formula 2. The focal group here is a carbonate group.

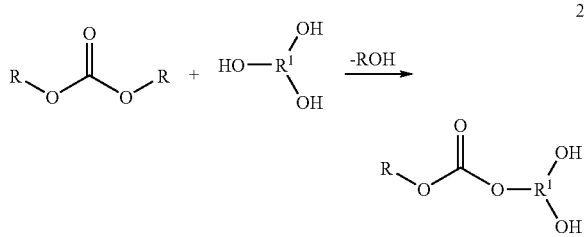

In the preparation of the condensation product (K) from a carbonate and a tetrahydric alcohol, likewise with the reaction ratio 1:1, the average result is a molecule of $XY_3$ type, illustrated by the general formula 3. The focal group here is a carbonate group.

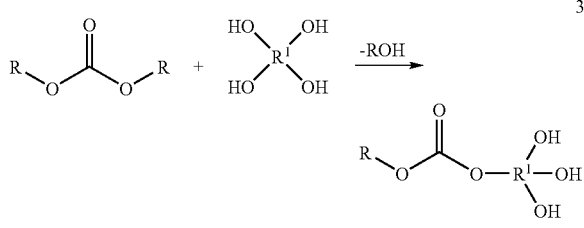

In the formulae 1-3, R is as defined at the outset and $R^1$ is an aliphatic or aromatic radical.

The condensation product (K) can also be prepared, for example, from a carbonate and a trihydric alcohol, illustrated by the general formula 4, the molar reaction ratio being 2:1. Here, the average result is a molecule of $X_2Y$ type; the focal group here is an OH group. In the formula 4, R and $R^1$ are each as defined in the formulae 1-3.

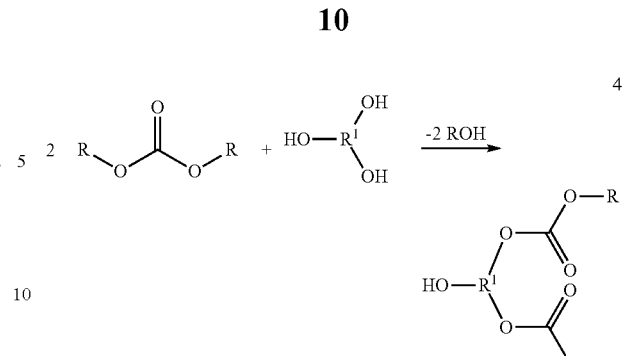

When difunctional compounds, for example a dicarbonate or a diol, are additionally added to the components, this brings about an extension of the chains, as illustrated in the general formula 5, for example. The average result is again a molecule of $XY_2$ type; the focal group is a carbonate group.

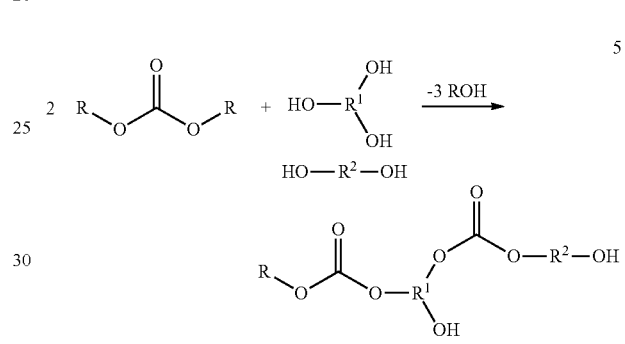

In formula 5, $R^2$ is an organic, preferably aliphatic radical; R and R' are each as defined above.

It is also possible to use two or more condensation products (K) for the synthesis. It is possible in this context firstly to use a plurality of alcohols or a plurality of carbonates. It is also possible to obtain mixtures of various condensation products of different structure by virtue of the selection of the ratio of the alcohols used and of the carbonates or of the phosgenes. This will be explained using the example of the reaction of a carbonate with a trihydric alcohol. If the starting materials are introduced in a ratio of 1:1, as illustrated in (II), the result is an $XY_2$ molecule. When the starting materials are used in a ratio of 2:1 as illustrated in (IV), an $X_2Y$ molecule is obtained. At a ratio between 1:1 and 2:1, a mixture of $XY_2$ and $X_2Y$ molecules is obtained.

According to the invention, the simple condensation products (K) described by way of example in the formulae 1-5 preferentially react intermolecularly to form highly functional polycondensation products, hereinafter referred to as polycondensation products (P). The reaction to give the condensation product (K) and to give the polycondensation product (P) usually takes place at a temperature of from 0 to 250° C., preferably from 60 to 160° C., in bulk or in solution. It is generally possible to use all solvents which are inert toward the particular reactants. Preference is given to using organic solvents, for example decane, dodecane, benzene, toluene, chloro-benzene, xylene, dimethylformamide, dimethylacetamide or Solvent Naphtha.

In a preferred embodiment, the condensation reaction is carried out in bulk. The phenol or the monohydric alcohol ROH released in the reaction can be removed by distillation from the reaction equilibrium to accelerate the reaction, if appropriate under reduced pressure.

If removal by distillation is intended, it is regularly advisable to use those carbonates which liberate alcohols ROH having a boiling point below 140° C. in the reaction.

To accelerate the reaction, it is also possible to add catalysts or catalyst mixtures. Suitable catalysts are compounds which catalyze esterification or transesterification reactions, for example alkali metal hydroxides, alkali metal carbonates, alkali metal hydrogencarbonates, preferably of sodium, of potassium or of cesium, tertiary amines, guanidines, ammonium compounds, phosphonium compounds, organoaluminum, organotin, organozinc, organotitanium, organozirconium or organobismuth compounds, or else what are known as double metal cyanide (DMC) catalysts, as described, for example, in DE 10138216 or DE 10147712.

Preference is given to using potassium hydroxide, potassium carbonate, potassium hydrogencarbonate, diazabicyclooctane (DABCO), diazabicyclononene (DBN), diazabicycloundecene (DBU), imidazoles such as imidazole, 1-methylimidazole or 1,2-dimethylimidazole, titanium tetrabutoxide, titanium tetraisopropoxide, dibutyltin oxide, dibutyltin dilaurate, tin dioctoate, zirconium acetylacetonate or mixtures thereof.

The catalyst is generally added in an amount of from 50 to 10 000 ppm by weight, preferably from 100 to 5000 ppm by weight, based on the amount of the alcohol mixture or alcohol used.

It is also possible to control the intermolecular polycondensation reaction by addition of the suitable catalyst or else by selection of a suitable temperature. It is also possible to adjust the average molecular weight of the polymer (P) via the composition of the starting components and via the residence time.

The condensation products (K) and the polycondensation products (P) prepared at elevated temperature are typically stable at room temperature for a prolonged period.

The nature of the condensation products (K) makes it possible for the condensation reaction to result in polycondensation products (P) with different structures, which have branching but no crosslinking. Moreover, in the ideal case, the polycondensation products (P) have either one carbonate group as focal group and more than two OH groups or else one OH group as focal group and more than two carbonate groups. The number of the reactive groups depends on the nature of the condensation products (K) used and the degree of polycondensation.

For example, a condensation product (K) of the general formula 2 can react by triple intermolecular condensation to give two different polycondensation products (P) which are represented in the general formulae 6 and 7:

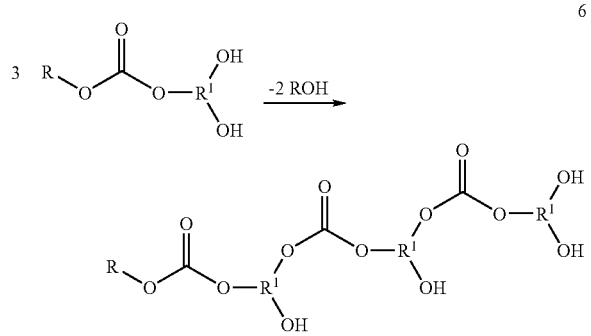

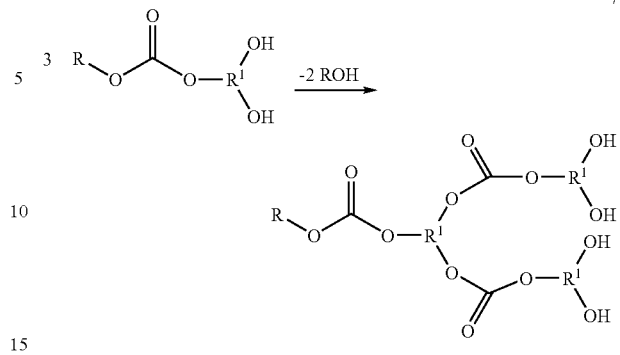

In formulae 6 and 7, R and $R^1$ are each as defined above.

For the termination of the intermolecular polycondensation reaction, there are various methods. For example, the temperature can be lowered to a range in which the reaction stops and the product (K) or the polycondensation product (P) is storage-stable.

It is also possible to deactivate the catalyst, for example by addition of Lewis acids or protic acids in the case of basic catalysts.

In another embodiment, as soon as a polycondensation product (P) with the desired degree of polycondensation is present as a result of the intermolecular reaction of the condensation product (K), a product having groups reactive toward the focal group of (P) may be added to the product (P) to terminate the reaction. For example, in the case of a carbonate group as focal group, a mono-, di-, or polyamine may be added. In the case of a hydroxyl group as focal group, for example, a mono-, di- or polyisocyanate, a compound comprising epoxy groups or an acid derivative which reacts with OH groups can be added to the product (P).

The inventive highly functional polycarbonates are usually prepared in the pressure range from 0.1 mbar to 20 bar, preferably at from 1 mbar to 5 bar, in reactors or reactor batteries which are operated batchwise, semicontinuously or continuously.

By virtue of the abovementioned adjustment of the reaction conditions and, if appropriate, by virtue of the selection of the suitable solvent, the inventive products can be further processed without further purification after their preparation.

In a further preferred embodiment, the product is stripped, i.e. freed of low molecular weight, volatile compounds. To this end, once the desired degree of conversion has been attained, the catalyst may optionally be deactivated and the low molecular weight, volatile constituents, for example monoalcohols, phenols, carbonates, hydrogen chloride or highly volatile oligomeric or cyclic compounds, can be removed by distillation, if appropriate with introduction of a gas, preferably nitrogen, carbon dioxide or air, if appropriate at reduced pressure.

In a further preferred embodiment, the inventive polycarbonates may obtain other functional groups in addition to the functional groups already present as a result of the reaction. The functionalization may take place during the molecular weight buildup, or else subsequently, i.e. after completion of the actual polycondensation.

When, prior to or during the molecular weight buildup, components are added which have further functional groups or functional elements in addition to hydroxyl or carbonate groups, a polycarbonate polymer with randomly distributed functionalities other than the carbonate or hydroxyl groups is obtained.

These effects can, for example, be achieved by addition, during the polycondensation, of compounds which bear further functional groups or functional elements, such as mercapto groups, primary, secondary or tertiary amino groups, ether groups, derivatives of carboxylic acids, derivatives of sulfonic acids, derivatives of phosphonic acids, silane groups, siloxane groups, aryl radicals or long-chain alkyl radicals, in addition to hydroxyl groups, carbonate groups or carbamoyl groups. For modification by means of carbamate groups, it is possible, for example, to use ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanol-amine, diisopropanolamine, tris(hydroxymethyl)aminomethane, tris(hydroxyethyl)-aminomethane, ethylenediamine, propylenediamine, hexamethylenediamine or isophoronediamine.

For modification with mercapto groups, it is possible, for example, to use mercapto-ethanol. By way of example, tertiary amino groups can be produced via incorporation of N-methyldiethanolamine, N-methyldipropanolamine or N,N-dimethylethanolamine. Ether groups can be obtained, for example, by cocondensation of dihydric or higher polyhydric polyetherols. Reaction with long-chain alkanediols can introduce long-chain alkyl radicals; reaction with alkyl or aryl diisocyanates generates polycarbonates having alkyl, aryl, and urethane groups or urea groups.

Addition of dicarboxylic acids or tricarboxylic acids, for example dimethyl terephthalate or tricarboxylic esters, allows ester groups to be obtained.

Subsequent functionalization can be obtained by reacting the resulting highly functional highly branched or highly functional hyperbranched polycarbonate in an additional process step (step c)) with a suitable functionalizing reagent which can react with the OH and/or carbonate groups or carbamoyl groups of the polycarbonate.

Highly functional highly branched or highly functional hyperbranched polycarbonates comprising hydroxyl groups can be modified, for example, by addition of molecules comprising acid groups or isocyanate groups. For example, polycarbonates containing acid groups can be obtained by reaction with compounds comprising anhydride groups.

Moreover, highly functional polycarbonates comprising hydroxyl groups can also be converted to highly functional polycarbonate polyether polyols by reaction with alkylene oxides, for example ethylene oxide, propylene oxide, or butylene oxide.

A great advantage of the process lies in its economic viability. Both the reaction to give a condensation product (K) or polycondensation product (P) and the reaction of (K) or (P) to give polycarbonates with other functional groups or elements can take place in one reaction apparatus, which is technically and economically advantageous.

As component B2), the inventive molding compositions may comprise at least one hyperbranched polyester of $A_xB_y$ type where x is at least 1.1, preferably at least 1.3, in particular at least 2
y is at least 2.1, preferably at least 2.5, in particular at least 3.

It is of course also possible to use mixtures as units A and/or B.

An $A_xB_y$-type polyester is a condensate composed of an x-functional molecule A and a y-functional molecule B. An example is a polyester composed of adipic acid as molecule A (x=2) and glycerol as molecule B (y=3).

In the context of this invention, hyperbranched polyesters B2 are uncrosslinked macromolecules having hydroxyl groups and carboxyl groups which have both structural and molecular non-uniformity. One possible structure is based on a central molecule in the same way as dendrimers, but with non-uniform chain length of the branches. Another possibility is a linear structure with functional pendant groups, or else a combination of the two extremes, with linear and branched molecular portions. See also P. J. Flory, J. Am. Chem. Soc. 1952, 74, 2718, and H. Frey et al., Chem. Eur. J. 2000, 6, No. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, more preferably from 20 to 95%.

"Dendrimeric" in the context of the present invention means that the degree of branching is from 99.9 to 100%. See H. Frey et al., Acta Polym. 1997, 48, 30 and the formula shown above under B1) for the definition of "degree of branching".

Component B2) preferably has an $M_n$ of from 300 to 30 000 g/mol, in particular from 400 to 25 000 g/mol and very particularly from 500 to 20 000 g/mol, determined by means of GPC, PMMA standard, dimethylacetamide eluent.

B2) preferably has an OH number of from 0 to 600 mg KOH/g of polyester, preferably of from 1 to 500 mg KOH/g of polyester, in particular from 20 to 500 mg KOH/g of polyester, to DIN 53240, and preferably a COOH number of from 0 to 600 mg KOH/g of polyester, preferably from 1 to 500 mg KOH/g of polyester, and in particular from 2 to 500 mg KOH/g of polyester.

The $T_g$ is preferably from −50° C. to 140° C., and in particular from −50 to 100° C. (by means of DSC, to DIN 53765).

Preference is given in particular to those components B2) in which at least one OH or COOH number is greater than 0, preferably greater than 0.1 and in particular greater than 0.5.

The inventive component B2) is in particular obtainable via the processes described below, specifically by reacting
(a) one or more dicarboxylic acids or one or more derivatives thereof with one or more at least trihydric alcohols,
or
(b) one or more tricarboxylic acids or higher polycarboxylic acids or one or more derivatives thereof with one or more diols
in the presence of a solvent and optionally in the presence of an inorganic, organometallic or low molecular weight organic catalyst, or of an enzyme. The reaction in solvent is the preferred preparation method.

In the context of the present invention, highly functional hyperbranched polyesters B2) have molecular and structural non-uniformity. Their molecular non-uniformity distinguishes them from dendrimers, and they can therefore be prepared at considerably lower cost.

The dicarboxylic acids which can be reacted according to variant (a) include, for example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid, and the abovementioned dicarboxylic acids may be substituted by one or more radicals selected from
$C_1$-$C_{10}$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl and n-decyl, $C_3$-$C_{12}$-cycloalkyl groups such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl and cycloheptyl;

alkylene groups such as methylene or ethylidene, or $C_6$-$C_{14}$-aryl groups such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl and 2-naphthyl, more preferably phenyl.

Examples of representatives of substituted dicarboxylic acids include: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

The dicarboxylic acids which can be reacted according to variant (a) also include ethylenically unsaturated acids, for example maleic acid and fumaric acid, and aromatic dicarboxylic acids such as phthalic acid, isophthalic acid or terephthalic acid.

It is also possible to use mixtures of two or more of the abovementioned representatives.

The dicarboxylic acids may either be used as such or in the form of derivatives.

Derivatives are preferably
the relevant anhydrides in monomeric or else polymeric form,
mono- or dialkyl esters, preferably mono- or dimethyl esters, or the corresponding mono- or diethyl esters, or else the mono- and dialkyl esters derived from higher alcohols such as n-propanol, isopropanol, n-butanol, isobutanol, tert-butanol, n-pentanol, n-hexanol,
and also mono- and divinyl esters, and
mixed esters, preferably methyl ethyl esters.

In the context of the preferred preparation, it is also possible to use a mixture of a dicarboxylic acid and one or more of its derivatives. Equally, it is possible to use a mixture of a plurality of different derivatives of one or more dicarboxylic acids.

Particular preference is given to using succinic acid, glutaric acid, adipic acid, phthalic acid, isophthalic acid, terephthalic acid, or their mono- or dimethyl esters. Very particular preference is given to using adipic acid.

Examples of at least trihydric alcohols which can be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylol-propane, trimethylolethane, pentaerythritol or dipentaerythritol; sugar alcohols such as mesoerythritol, threitol, sorbitol, mannitol, or mixtures of the above at least trihydric alcohols. Preference is given to using glycerol, trimethylolpropane, trimethylolethane and pentaerythritol.

Examples of tricarboxylic acids or polycarboxylic acids which can be reacted according to variant (b) are benzene-1,2,4-tricarboxylic acid, benzene-1,3,5-tricarboxylic acid, benzene-1,2,4,5-tetracarboxylic acid and mellitic acid.

Tricarboxylic acids or polycarboxylic acids can be used in the inventive reaction either as such or in the form of derivatives.

Derivatives are preferably
the relevant anhydrides in monomeric or else polymeric form,
mono-, di- or trialkyl esters, preferably mono-, di- or trimethyl esters, or the corresponding mono-, di- or triethyl esters, or else the mono-, di- and triesters derived from higher alcohols such as n-propanol, isopropanol, n-butanol, isobutanol, tert-butanol, n-pentanol, n-hexanol, or else mono-, di- or trivinyl esters
and mixed methyl ethyl esters.

In the context of the present invention, it is also possible to use a mixture of a tri- or polycarboxylic acid and one or more of its derivatives. In the context of the present invention it is equally possible to use a mixture of a plurality of different derivatives of one or more tri- or polycarboxylic acids in order to obtain component B2).

Examples of diols used for variant (b) of the present invention are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, 2-methyl pentane-2,4-diol, 2,4-dimethyl-pentane-2,4-diol, 2-ethylhexane-1,3-diol, 2,5-dimethylhexane-2,5-diol, 2,2,4-trimethyl-pentane-1,3-diol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more representative compounds of the above compounds, where n is an integer and n=from 4 to 25. One hydroxyl group or else both hydroxyl groups in the aforementioned diols may also be replaced by SH groups. Preference is given to ethylene glycol, propane-1,2-diol, and diethylene glycol, triethylene glycol, dipropylene glycol, and tripropylene glycol.

The molar ratio of the molecules A to molecules B in the $A_xB_y$ polyester in the variants (a) and (b) is from 4:1 to 1:4, in particular from 2:1 to 1:2.

The at least trihydric alcohols reacted according to variant (a) of the process may have hydroxyl groups each of the same reactivity. Preference is also given here to at least trihydric alcohols whose OH groups initially have the same reactivity, but where reaction with at least one acid group can induce a decline in reactivity of the remaining OH groups caused by steric or electronic effects. For example, this is the case when trimethylolpropane or pentaerythritol is used.

However, the at least trihydric alcohols reacted according to variant (a) may also have hydroxyl groups having at least two different chemical reactivities.

The different reactivity of the functional groups may either stem from chemical causes (e.g. primary/secondary/tertiary OH group) or from steric causes.

For example, the triol may be a triol which has primary and secondary hydroxyl groups; the preferred example is glycerol.

When the inventive reaction is carried out according to variant (a), preference is given to working in the absence of diols and monohydric alcohols.

When the inventive reaction is carried out according to variant (b), preference is given to working in the absence of mono- or dicarboxylic acids.

The inventive process is carried out in the presence of a solvent. Examples of suitable solvents are hydrocarbons such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents in the absence of acidic catalysts are: ethers, for example dioxane or tetrahydrofuran, and ketones, for example methyl ethyl ketone and methyl isobutyl ketone.

According to the invention, the amount of solvent added is at least 0.1% by weight, based on the mass of the starting materials used and to be reacted, preferably at least 1% by weight and more preferably at least 10% by weight. It is also possible to use excesses of solvent, based on the mass of starting materials used and to be reacted, for example from 1.01 to 10 times the amount. Solvent amounts of more than 100 times the mass of the starting materials used and to be reacted are not advantageous, because the reaction rate declines markedly at markedly lower concentrations of the reactants, which leads to uneconomically long reaction times.

To carry out the process preferred in accordance with the invention, it is possible to work in the presence of a dehydrating agent as an additive, which is added at the start of the reaction. Suitable examples are molecular sieves, in particular 4 Å molecular sieve, $MgSO_4$ and $Na_2SO_4$. During the reaction, it is also possible to add further dehydrating agent or to replace dehydrating agent with fresh dehydrating agent. During the reaction, it is also possible to distill off the water or alcohol formed and, for example, to use a water separator.

The process can be carried out in the absence of acidic catalysts. Preference is given to working in the presence of an acidic inorganic, organometallic or organic catalyst, or mixtures of two or more acidic inorganic, organometallic or organic catalysts.

In the context of the present invention, examples of acidic inorganic catalysts are sulfuric acid, phosphoric acid, phosphonic acid, hypophosphorous acid, aluminum sulfate hydrate, alum, acidic silica gel (pH=6, in particular =5) and acidic aluminum oxide. Further examples of compounds which can be used as acidic inorganic catalysts are aluminum compounds of the general formula $Al(OR)_3$ and titanates of the general formula $Ti(OR)_4$, where each of the R radicals may be the same or different and is selected independently from
$C_1$-$C_{10}$-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl and n-decyl,
$C_3$-$C_{12}$-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl and cycloheptyl.

Each of the R radicals in $Al(OR)_3$ or $Ti(OR)_4$ is preferably the same and selected from isopropyl or 2-ethylhexyl.

Examples of preferred acidic organometallic catalysts are selected from dialkyltin oxides $R_2SnO$ where R is as defined above. A particularly preferred representative compound of acidic organometallic catalysts is di-n-butyltin oxide, which is commercially available as "oxo-tin", or di-n-butyltin dilaurate.

Preferred acidic organic catalysts are acidic organic compounds having, for example, phosphate groups, sulfonic acid groups, sulfate groups or phosphonic acid groups. Particular preference is given to sulfonic acids, for example para-toluenesulfonic acid. The acidic organic catalysts used can also be acidic ion exchangers, for example sulfonic acid group-containing polystyrene resins which are crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic or organic catalysts, the amount used in accordance with the invention is from 0.1 to 10% by weight, preferably from 0.2 to 2% by weight, of catalyst.

The inventive process is carried out under an inert gas atmosphere, i.e., for example, under carbon dioxide, nitrogen or a noble gas, among which particular mention should be made of argon.

The inventive process is carried out at temperatures of from 60 to 200° C. Preference is given to working at temperatures of from 130 to 180° C., in particular up to 150° C. or lower. Particular preference is given to maximum temperatures up to 145° C., very particular preference to temperatures up to 135° C.

The pressure conditions for the inventive process are not critical per se. It is possible to work at distinctly reduced pressure, for example at from 10 to 500 mbar. The inventive process may also be carried out at pressures above 500 mbar. For reasons of simplicity, preference is given to the reaction at atmospheric pressure; however, it is also possible to work at slightly increased pressure, for example up to 1200 mbar. It is also possible to work at distinctly elevated pressure, for example at pressures up to 10 bar. Preference is given to the reaction at atmospheric pressure.

The reaction time for the inventive process is typically from 10 minutes to 25 hours, preferably from 30 minutes to 10 hours and more preferably from one to 8 hours.

Once the reaction has ended, the highly functional hyperbranched polyesters can easily be isolated, for example by filtering off the catalyst and concentrating, the concentration typically being effected at reduced pressure. Further very suitable workup methods are precipitation after addition of water, followed by washing and drying.

Component B2) can also be prepared in the presence of enzymes or decomposition products of enzymes (according to DE-A 101 63163). In the context of the present invention, the dicarboxylic acids reacted in accordance with the invention are not included in the acidic organic catalysts.

Preference is given to using lipases or esterases. Very suitable lipases and esterases are *Candida cylindracea, Candida lipolytica, Candida rugosa, Candida antarctica, Candida utilis, Chromobacterium viscosum, Geolrichum viscosum, Geotrichum candidum, Mucor javanicus, Mucor mihei*, pig pancreas, *pseudomonas* spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii*, or esterase from *Bacillus* spp. and *Bacillus thermoglucosidasius*. Particular preference is given to *Candida antarctica* lipase B. The enzymes listed are commercially available, for example from Novozymes Biotech Inc., Denmark.

The enzyme is preferably used in immobilized form, for example on silica gel or Lewatit®. The processes for immobilizing enzymes are known per se, for example from Kurt Faber, "Biotransformations in organic chemistry", 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme used is from 0.1 to 20% by weight, in particular from 10 to 15% by weight, based on the mass of all of the starting materials used and to be reacted.

The inventive process is carried out at temperatures above 60° C. Preference is given to working at temperatures of 100° C. or lower. Preference is given to temperatures up to 80° C., very particular preference is given to temperatures of from 62 to 75° C., and even greater preference is given to temperatures of from 65 to 75° C.

The inventive process is carried out in the presence of a solvent. Examples of suitable solvents are hydrocarbons such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Further very particularly suitable solvents are: ethers, for example dioxane or tetrahydrofuran, and ketones, for example methyl ethyl ketone and methyl isobutyl ketone.

The amount of solvent added is at least 5 parts by weight, based on the mass of the starting materials used and to be reacted, preferably at least 50 parts by weight and more preferably at least 100 parts by weight. Amounts of more than 10 000 parts by weight of solvent are undesirable, because the reaction rate declines markedly at markedly lower concentrations, which leads to uneconomically long reaction times.

The inventive process is carried out at pressures above 500 mbar. Preference is given to the reaction at atmospheric pressure or slightly elevated pressure, for example up to 1200 mbar. It is also possible to work under distinctly elevated pressure, for example at pressures up to 10 bar. Preference is given to the reaction at atmospheric pressure.

The reaction time of the inventive process is typically from 4 hours to 6 days, preferably from 5 hours to 5 days and more preferably from 8 hours to 4 days.

Once the reaction has ended, the highly functional hyperbranched polyesters can be isolated, e.g. by filtering off the enzyme and concentrating the mixture, the concentration typically being carried out at reduced pressure. Other very suitable workup methods are precipitation after addition of water, followed by washing and drying.

The highly functional hyperbranched polyesters obtainable by the inventive process feature particularly low contents of discolored and resinified material. For the definition of hyperbranched polymers, see also: P. J. Flory, J. Am. Chem. Soc. 1952, 74, 2718, and A. Sunder et al., Chem. Eur. J. 2000, 6, no. 1, 1-8. However, in the context of the present invention, "highly functional hyperbranched" means that the degree of branching, i.e. the average number of dendritic linkages plus the average number of end groups per molecule, is from 10 to 99.9%, preferably from 20 to 99%, more preferably from 30 to 90% (on this subject, see H. Frey et al. Acta Polym. 1997, 48, 30).

The inventive polyesters have a molecular weight $M_w$ of from 500 to 50 000 g/mol, preferably from 1000 to 20 000 g/mol, more preferably from 1000 to 19 000 g/mol. The polydispersity is from 1.2 to 50, preferably from 1.4 to 40, more preferably from 1.5 to 30 and most preferably from 1.5 to 10. They are typically very soluble, i.e. clear solutions can be prepared using up to 50% by weight, in some cases even up to 80% by weight, of the inventive polyesters in tetrahydrofuran (THF), n-butyl acetate, ethanol, and numerous other solvents, with no gel particles detectable by the naked eye.

The inventive highly functional hyperbranched polyesters are carboxyl-terminated, carboxyl- and hydroxyl-terminated, and preferably hydroxyl-terminated.

When they are used in a mixture, the ratios of the components B1):B2) are preferably from 1:20 to 20:1, in particular from 1:15 to 15:1, and very particularly from 1:5 to 5:1.

The hyperbranched polycarbonates B1)/polyesters B2) used are nanoparticles. The size of the particles in the compounded material is from 20 to 500 nm, preferably 50-300 nm.

Such compounded materials are commercially available, for example as Ultradur® high speed.

As component C), the inventive molding compositions comprise from 0.01 to 10% by weight, preferably from 0.5 to 7% by weight and in particular from 1 to 5% by weight, of a carbodiimide, preferably based on 2,4'-MDI (2,4'-diisocyanatodiphenylmethane), which may comprise up to 60 mol %, preferably up to 30 mol %, of units based on other isocyanates.

Preference is given to those oligomeric carbodiimides which are formed from 2,4'-MDI alone. However, it is also possible to use up to 60 mol %, preferably up to 30 mol %, of at least one further di- or polyfunctional aromatic isocyanate. Such cooligomers also still have good performance properties.

Useful further isocyanates are principally bicyclic compounds such as 4,4'-diisocyanatodiphenylmethane or naphthalene 1,5-diisocyanate, and also polycyclic, higher-functionality isocyanates, as are obtained in the preparation of 4,4'-diisocyanato-diphenylmethane. The fraction of these higher-functionality isocyanates is preferably in the range from 0.5 to 5% by weight, based on the mixture of 2,4'-MDI with the other diisocyanates.

Preference is given to oligomeric carbodiimides of average degree of condensation from 2 to 10, since they can generally be incorporated particularly well into the polyesters to be stabilized. More highly condensed carbodiimides are generally solid and high-melting, and are therefore less easy to mix homogeneously with the polymeric polyester.

Since the oligomeric carbodiimides from the components still bear free isocyanate groups, they are only storable to a limited extent and therefore have to be sent to their end use rapidly. Preference is therefore generally given to those inventive compounds whose isocyanate groups have been saturated with an alcohol or amine to form urethane or urea groups.

The chemical nature of the alcohols and amines is less significant, as long as they do not comprise any reactive groups, for example carboxyl groups, which is, though, self-evident. In general, preference is given to alcohols, specifically to $C_1$ to $C_{18}$ alcohols such as methanol, ethanol, propanol, butanol, isopropanol, 2-ethylhexanol and dodecanol, and $C_2$ to $C_8$ alkanols in particular are useful.

Amines, preferably secondary dialkylamines having a total of from 2 to 12 carbon atoms, such as diethylamine, dipropylamine and dibutylamine are also suitable, but have the disadvantage of a usually unpleasant odor which makes necessary the technically costly and inconvenient removal of unconverted residual amounts.

The oligocondensation of the isocyanates can be carried out at from 40 to 200° C. Appropriate processes are described by W. Neumann and P. Fischer, Angew. Chemie 74, 801 (1962), in which it is recommended also to use catalysts. Particularly suitable catalysts are phospholene oxides such as 1-methyl-1-phospha-2-cyclopentene 1-oxide and 1-methyl-1-phospha-3-cyclopentene 1-oxide. The reaction is effected usually at a temperature between 40 and 200° C., preferably between 80 and 200° C., more preferably between 100 and 180° C. and in particular between 120 and 180° C. The pressure in the reaction is usually in the range between 0.001 and 10 bar, preferably between 0.001 and 1 bar, more preferably between 0.001 and 0.7 bar and in particular between 0.01 and 0.5 bar.

The selection of the reaction conditions such as the temperature, the type of catalyst and the amount of catalyst, and also the reaction time, allows those skilled in the art to adjust the degree of condensation in the customary manner. The simplest way of monitoring the progress of the reaction is by determination of the NCO content. Other parameters such as rise in viscosity, deepening of color or evolution of $CO_2$ can be employed for the progress and the control of the reaction.

After the condensation has ended, as is usually recommended for the aforementioned reasons, the free isocyanate groups are reacted with an alcohol or amine by adding this component to the condensation product, preferably in a small excess, allowing it to react and either distilling off the remainder under reduced pressure or leaving it in the product.

In a preferred embodiment, the inventive carbodiimides can be prepared in such a way that initially up to 50 mol %, preferably up to 40 mol %, of the isocyanate groups are reacted with an alcohol or amine, and then the condensation reaction is undertaken. This procedure is preferred especially when the 2,4'-MDI is used in the mixture with other diisocyanates.

Since monofunctional chain-breaking compounds are already present in the condensation of this process, it permits the attainment of a relatively uniform degree of condensation. When the amount of the alcohol or amine is, for example, 20 mol % based on the amount of all isocyanate groups, an average degree of condensation of 5 is calculated therefrom, which also corresponds roughly to the actual degree of condensation according to the observations to date. In the case of 50 mol %, dimers are obtained theoretically, and, in the case of amounts of alcohol and amine of above 50 mol %, not only are dimeric carbodiimides obtained, but also the corresponding bisurethanes or bisureas of the diisocyanates used, which do not have the diimide function which is desired per se but ease the incorporation of the carbodiimides into the plastic masses.

Preferred components C) are obtainable by a process for preparing carbodiimides by reaction of 2,4'-MDI in the presence of catalysts, the catalysts being used in an amount between 0.1 and 200 ppm, preferably between 0.1 and 100 ppm and in particular between 1 and 80 ppm, based in each case on all feedstocks of the process, and the catalysts remain in the product after the preparation of the carbodiimides.

Preferred inventive carbodiimides have a content of carbodiimidazation catalysts of from 0.1 to 200 ppm, preferably from 0.1 to 100 ppm.

As component D), the inventive molding compositions may comprise from 0 to 60% by weight, in particular up to 50% by weight, of other additives and processing assistants.

As component D), the inventive molding compositions may comprise from 0 to 5% by weight, preferably from 0.05 to 3% by weight and in particular from 0.1 to 2% by weight, of at least one ester or amide of saturated or unsaturated aliphatic carboxylic acids having from 10 to 40 carbon atoms, preferably from 16 to 22 carbon atoms, with aliphatic saturated alcohols or amines having from 2 to 40 carbon atoms, preferably from 2 to 6 carbon atoms.

The carboxylic acids may be monobasic or dibasic. Examples which may be mentioned are pelargonic acid, palmitic acid, lauric acid, margaric acid, dodecanedioic acid, behenic acid, and more preferably stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono- to trifunctional. Examples thereof are stearyl-amine, ethylenediamine, propylenediamine, hexamethylenediamine, di(6-amino-hexyl)amine, particular preference being given to ethylenediamine and hexamethylenediamine. Correspondingly, preferred esters or amides are glycerol distearate, glycerol tristearate, ethylenediamine distearate, glycerol monopalmitate, glyceryl trilaurate, glyceryl monobehenate and pentaerythrityl tetrastearate.

It is also possible to use mixtures of different esters or amides, or esters in combination with amides, in which case the mixing ratio here is as desired.

Further usual additives D) are, for example in amounts of up to 40% by weight, preferably up to 30% by weight, elastomeric polymers (also often referred to as impact modifiers, elastomers or rubbers).

In quite general terms, these are copolymers which have preferably been formed from at least two of the following monomers: ethylene, propylene, butadiene, isobutene, isoprene, chloroprene, vinyl acetate, styrene, acrylonitrile and acrylic and/or methacrylic esters having from 1 to 18 carbon atoms in the alcohol component.

Such polymers of this type are described, for example, in Houben-Weyl, Methoden der organischen Chemie [Methods of Organic Chemistry], Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have virtually no residual double bonds, whereas EPDM rubbers may have from 1 to 20 double bonds per 100 carbon atoms.

Examples of diene monomers for EPDM rubbers include conjugated dienes, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes such as cyclopentadiene, cyclohexadienes, cyclo-octadienes and dicyclopentadiene, and also alkenylnorbornenes such as 5-ethylidene-2-norbornene, 5-butylidene-2-norbornene, 2-methallyl-5-norbornene and 2-isopropenyl-5-norbornene, and tricyclodienes such as 3-methyltricyclo[5.2.1.0$^{2,6}$]-3,8-decadiene, or mixtures thereof. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also be grafted with reactive carboxylic acids or with derivatives of these. Examples include acrylic acid, methacrylic acid and derivatives thereof, e.g. glycidyl (meth)acrylate, and also maleic anhydride.

A further group of preferred rubbers is that of copolymers of ethylene with acrylic acid and/or methacrylic acid and/or with the esters of these acids. The rubbers may additionally comprise dicarboxylic acids such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formula I, II, III or IV

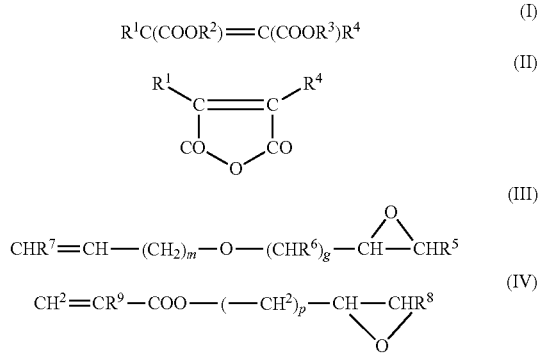

where $R^1$ to $R^9$ are hydrogen or alkyl groups having from 1 to 6 carbon atoms, and m is an integer from 0 to 20, g is an integer from 0 to 10 and p is an integer from 0 to 5.

The $R^1$ to $R^9$ radicals are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy group-comprising esters of acrylic acid and/or methacrylic acid, such as glycidyl acrylate and glycidyl methacrylate, and the esters with tertiary alcohols, such as tert-butyl acrylate. Although the latter do not have any free carboxyl groups, their behavior approximates to that of the free acids and they are therefore referred to as monomers with latent carboxyl groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylic esters.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Other preferred esters of acrylic and/or methacrylic acid are the methyl, ethyl, propyl, isobutyl and tert-butyl esters.

In addition, vinyl esters and vinyl ethers may also be used as comonomers.

The ethylene copolymers described above may be prepared by processes known per se, preferably by random copolymerization under elevated pressure and elevated temperature. Appropriate processes are well known.

Preferred elastomers are also emulsion polymers whose preparation is described, for example, by Blackley in the monograph "Emulsion polymerization". The emulsifiers and catalysts which can be used are known per se.

In principle, it is possible to use homogeneously structured elastomers or else those with a shell structure. The shell-type structure is determined by the sequence of addition of the individual monomers; the morphology of the polymers is also affected by this sequence of addition.

Monomers which may be mentioned here, merely as examples, for the preparation of the rubber fraction of the elastomers are acrylates, for example n-butyl acrylate and 2-ethylhexyl acrylate, corresponding methacrylates, butadiene and isoprene, and also mixtures thereof. These monomers may be copolymerized with further monomers, for example styrene, acrylonitrile, vinyl ethers and further acrylates or methacrylates, for example methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells); elastomers having more than one shell may also have more than one shell composed of a rubber phase.

When one or more hard components (with glass transition temperatures above 20° C.) are involved, in addition to the rubber phase, in the structure of the elastomer, they are generally prepared by polymerizing, as principal monomers, styrene, acrylonitrile, methacrylonitrile, α-methylstyrene, p-methylstyrene, acrylic esters or methacrylic esters, such as methyl acrylate, ethyl acrylate or methyl methacrylate. In addition, it is also possible to use smaller proportions of further comonomers.

In some cases, it has been found to be advantageous to use emulsion polymers which have reactive groups at the surface. Examples of such groups are epoxy, carboxyl, latent carboxyl, amino and amide groups, and also functional groups which may be introduced by also using monomers of the general formula

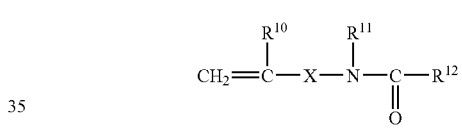

where the substituents may be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group or —$OR^{13}$
$R^{13}$ is a $C_1$-$C_8$-alkyl or $C_6$-$C_{12}$-aryl group which may optionally be substituted by O- or N-containing groups,
X is a chemical bond, a $C_1$-$C_{10}$-alkylene group or a $C_6$-$C_{12}$-arylene group, or

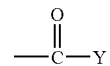

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Further examples include acrylamide, methacrylamide and substituted esters of acrylic acid or methacrylic acid, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also be crosslinked. Examples of crosslinking monomers include 1,3-butadiene, divinylbenzene, diallyl phthalate and dihydrodicyclopentadienyl acrylate, and also the compounds described in EP-A 50 265.

It is also possible to use what are known as graft-linking monomers, i.e. monomers having two or more polymerizable double bonds which react at different rates in the polymerization. Preference is given to using such compounds in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. When a further phase is then grafted onto a rubber of this type, at least some of the double bonds present in the rubber react with the graft monomers to form chemical bonds, i.e. the phase grafted on is joined at least partly to the graft base via chemical bonds.

Examples of such graft-linking monomers are monomers comprising allyl groups, in particular allyl esters of ethylenically unsaturated carboxylic acids, for example allyl acrylate, allyl methacrylate, diallyl maleate, diallyl fumarate, diallyl itaconate, or the corresponding monoallyl compounds of these dicarboxylic acids. In addition, there is a multitude of further suitable graft-linking monomers; for further details, reference is made here, for example, to U.S. Pat. No. 4,148,846.

In general, the proportion of these crosslinking monomers in the impact-modifying polymer is up to 5% by weight, preferably not more than 3% by weight, based on the impact-modifying polymer.

Some preferred emulsion polymers are listed below. Mention should first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but also with use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but also with use of monomers having reactive groups, as described herein |
| V | styrene, acrylonitrile, methyl methacrylate, or a mixture of these | first envelope composed of monomers as described under I and II for the core second envelope as described under I or IV for the envelope |

These graft polymers, in particular ABS polymers and/or ASA polymers, are preferably used in amounts of up to 40% by weight for the impact-modification of PBT, if appropriate in a mixture with up to 40% by weight of polyethylene terephthalate. Corresponding blend products are obtainable with the trademark Ultradur® S (previously Ultrablend® S from BASF AG).

Instead of graft polymers whose structure has more than one shell, it is also possible to use homogeneous, i.e. single-shell, elastomers composed of 1,3-butadiene, isoprene and n-butyl acrylate or their copolymers. These products too may be prepared by also using crosslinking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers with an inner core composed of n-butyl acrylate or based on butadiene and with an outer envelope composed of the aforementioned copolymers, and copolymers of ethylene with comonomers which supply reactive groups.

The elastomers described may also be prepared by other conventional processes, for example by suspension polymerization.

Preference is likewise given to silicone rubbers, as described in DE-A 37 25 576, EP-A 235 690, DE-A 38 00 603 and EP-A 319 290.

It is of course also possible to use mixtures of the types of rubber listed above.

Fibrous or particulate fillers D) include carbon fibers, glass fibers, glass beads, amorphous silica, asbestos, calcium silicate, calcium metasilicate, magnesium carbonate, kaolin, chalk, powdered quartz, mica, barium sulfate and feldspar, which are used in amounts of up to 50% by weight, in particular up to 40% by weight.

Preferred fibrous fillers include carbon fibers, aramid fibers and potassium titanate fibers, and particular preference is given to glass fibers in the form of E glass. These may be used in the form of rovings or in the commercially available forms of chopped glass.

Preference is given in particular to mixtures of glass fibers D) with component B) in a ratio of from 1:100 to 1:2 and preferably from 1:10 to 1:3.

The fibrous fillers may be surface-pretreated with a silane compound for better compatibility with the thermoplastic.

Suitable silane compounds are those of the general formula:

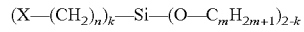

in which the substituents are each defined as follows:

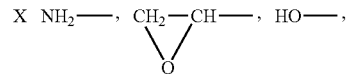

n is an integer from 2 to 10, preferably 3 to 4,
m is an integer from 1 to 5, preferably 1 to 2, and
k is an integer from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as the substituent X.

The silane compounds are used for surface coating generally in amounts of from 0.05 to 5% by weight, preferably from 0.5 to 1.5% by weight and in particular from 0.8 to 1% by weight (based on D).

Acicular mineral fillers are also suitable.

In the context of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, be pretreated with the aforementioned silane compounds, but the pretreatment is not essential.

Further fillers include kaolin, calcined kaolin, wollastonite, talc and chalk.

As component D), the inventive thermoplastic molding compositions may comprise the usual processing assistants, such as stabilizers, oxidation retarders, agents to counteract thermal decomposition and decomposition by ultraviolet light, lubricants and mold-release agents, colorants such as dyes and pigments, nucleating agents, plasticizers, etc.

Examples of oxidation retarders and heat stabilizers include sterically hindered phenols and/or phosphites, hydroquinones, aromatic secondary amines such as diphenylamines, various substituted representatives of these groups, and mixtures thereof in concentrations of up to 1% by weight, based on the weight of the thermoplastic molding compositions.

UV stabilizers which are generally used in amounts of up to 2% by weight, based on the molding composition, include various substituted resorcinols, salicylates, benzotriazoles, and benzophenones.

It is possible to add inorganic pigments such as titanium dioxide, ultramarine blue, iron oxide and carbon black, and also organic pigments such as phthalocyanines, quinacridones and perylenes, and also dyes such as nigrosine and anthraquinones.

Nucleating agents which may be used are sodium phenylphosphinate, alumina, silica, and preferably talc.

Further lubricants and mold-release agents are used typically in amounts of up to 1% by weight. Preference is given to long-chain fatty acids (e.g. stearic acid or behenic acid), salts of these (e.g. calcium stearate or zinc stearate) or montan waxes (mixtures composed of straight-chain, saturated carboxylic acids having chain lengths of from 28 to 32 carbon atoms), and also to calcium montanate or sodium montanate, and also to low molecular weight polyethylene waxes and low molecular weight polypropylene waxes.

Examples of plasticizers include dioctyl phthalate, dibenzyl phthalate, butyl benzyl phthalate, hydrocarbon oils and N-(n-butyl)benzenesulfonamide.

The inventive molding compositions may also comprise from 0 to 2% by weight of fluorine-containing ethylene polymers. These are polymers of ethylene with a fluorine content of from 55 to 76% by weight, preferably from 70 to 76% by weight.

Examples thereof are polytetrafluoroethylene (PTFE), tetrafluoroethylene/hexafluoro-propylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-containing ethylene polymers are distributed homogeneously in the molding compositions and preferably have a particle size $d_{50}$ (number-average) in the range from 0.05 to 10 μm, in particular from 0.1 to 5 μm. These small particle sizes can more preferably be achieved by use of aqueous dispersions of fluorine-containing ethylene polymers and their incorporation into a polyester melt.

The inventive thermoplastic molding compositions may be prepared by methods known per se, by mixing the starting components in conventional mixing apparatus, such as screw extruders, Brabender mixers or Banbury mixers, and then extruding them. After the extrusion, the extrudate may be cooled and comminuted. It is also possible to premix individual components and then to add the remaining starting materials individually and/or likewise in a mixture. The mixing temperatures are generally from 230 to 290° C.

In a further preferred method, components B) and C) and, if appropriate, D) may be mixed with a prepolymer, compounded and granulated. The resulting granule is subsequently condensed in the solid phase under an inert gas, continuously or batchwise, at a temperature below the melting point of component A) up to the desired viscosity.

The inventive thermoplastic molding compositions feature good flowability with simultaneously good mechanical properties.

In particular, the processing of the individual components (without clumping or caking) is problem-free and possible in short cycle times, so that thin-wall components in particular are possible applications, with very little mold deposit.

The morphology of selected compounded materials was studied by transmission electron microscopy. Good dispersion of the particles in the blend is seen. Particle sizes of 20-500 nm were observed. The typical exudation of the additives was minimized.

These materials are suitable for the production of fibers, films and moldings of any type, in particular for applications as plugs, switches, casing parts, casing covers, headlamp bezels, shower heads, fittings, smoothing irons, rotary switches, stove controls, fryer lids, door handles, (rear) mirror housings, (tailgate) screen wipers, sheathing for optical conductors.

EXAMPLES

Component A

Polybutylene terephthalate with a viscosity number VN of 130 ml/g and a carboxyl end group content of 34 meq/kg (Ultradur® B 4500 from BASF AG) (VN measured in 0.5% by weight solution of phenol/o-dichlorobenzene, 1:1 mixture at 25° C.).

Preparation Method for Polycarbonates B1

General Method:

As shown in table 1, equimolar amounts of the polyhydric alcohol and diethyl carbonate were mixed in a three-neck flask equipped with stirrer, reflux condenser, and internal thermometer, and 250 ppm of catalyst (based on the amount of alcohol) were added. The mixture was then heated to 100° C. with stirring, to 140° C. in the experiment indicated by *, and stirred at this temperature for 2 h. As the reaction progressed, the temperature of the reaction mixture was reduced as a result of the onset of evaporative cooling of the monoalcohol released. The reflux condenser was now replaced by an inclined condenser, ethanol was distilled off, and the temperature of the reaction mixture was increased slowly to 160° C.

The ethanol distilled off was collected in a cooled round-bottom flask and weighed, and the conversion was thus determined as a percentage based on the full conversion theoretically possible (see table 1).

The reaction products were then analyzed by gel permeation chromatography, the eluent being dimethylacetamide and the standard being polymethyl methacrylate (PMMA).

TABLE 1

| Alcohol | Catalyst | Amount of ethanol distillate based on full conversion [Mol %] | Molecular weight $M_w$ $M_n$ | Visc. 23° C. [mPas] | OH number [mg KOH/g] |
|---|---|---|---|---|---|
| TMP · 1.2 PO | $K_2CO_3$ | 90 | 2136 1446 | 7200 | 461 |

TMP ≙ Trimethylolpropane
PO ≙ Propylene oxide

Component C

Synthesis of an Oligomeric Carbodiimide 600 g (2.4 mol) of a mixture of equal parts of 2,4'-diisocyanatodiphenylmethane and 4,4'-diisocyanatodiphenylmethane were heated to 90° C. in a stirred flask with thermometer and dropping funnel. To this were added 73.6 g (1.6 mol) of ethanol. After 60 minutes, the NCO content of the mixture had fallen to 20.2% by weight. Afterward, 3.36 g of a 1% by weight solution of a mixture of 1-methyl-1-phospha- 2-cyclopentene 1-oxide and 1-methyl-1-phospha-3-cyclopentene 1-oxide in chlorobenzene was added, a pressure of 200 mbar was applied and the reaction mixture was heated to 150° C. After 105 minutes, the mixture had an NCO content of 3.1% by weight. The mixture was allowed to cool to 125° C. and the remaining NCO groups were converted by addition of 23 g (0.5 mol) of ethanol.

The product had a melting point at from 112 to 116° C.

Component D

Glass Fibers Having an Average Thickness of 10 μm (Epoxy-Silanized Size)

Preparation of the Molding Compositions

Components A) to D) were blended in a twin-screw extruder at from 250 to 260° C., and extruded into a water bath. After granulation and drying, test specimens were injection-molded and tested.

The granule was injection-molded into dumbbell specimens to ISO 527-2, and a tensile test was carried out. In addition, impact resistance was determined to ISO 179-2, viscosity (solvent for PBT to DIN 53728: phenol/1,2-dichlorobenzene (1:1) ISO 1628), MVR, (ISO 1133) and the flow behavior were tested, and the flame retardancy was determined to UL 94.

The inventive compositions and the results of the measurements can be taken from the table.

bonate (DIN 53240, part 2) in which component B1) has a glass transition temperature Tg of from −80° C. to 140° C., or B2) at least one hyperbranched polyester of the $A_xB_y$ type where x is at least 1.1 and y is at least 2.1 in which component B2) has a glass transition temperature $T_g$ of from −50° C. to 140° C., or mixtures of B1) and B2), wherein a degree of branching of both B1) and B2) is from 10 to 99.9%, and wherein B1) and B2) have both structural and molecular non-uniformity;

C) from 0.1 to 10% by weight of at least one carbodiimide,

D) from 0 to 60% by weight of further additives, the sum of the percentages by weight of components A) to D) adding up to 100%.

2. The thermoplastic molding composition according to claim 1, in which component B2) has a number-average molecular weight $M_n$, of from 300 to 30 000 g/mol.

3. The thermoplastic molding composition according to claim 1, in which component B2) has an OH number (to DIN 53240) of from 0 to 600 mg KOH/g of polyester.

4. The thermoplastic molding composition according to claim 1, in which component B2) has a COOH number (to DIN 53240) of from 0 to 600 mg KOH/g of polyester.

5. The thermoplastic molding composition according to claim 1, in which component B2) has at least one OH number or COOH number greater than 0.

TABLE

|  |  | 1C | 2C | 3 | 4 | 5C |
|---|---|---|---|---|---|---|
| Component A |  | 70 | 69.25 | 66.75 | 66.5 | 67.5 |
| Component B |  |  | 0.75 | 0.75 | 1.00 |  |
| Component C |  |  |  | 2.50 | 2.50 | 2.50 |
| Component D |  | 30.00 | 30.00 | 30.00 | 30.00 | 30.00 |
| MVR | (250° C. - 2.16 kp) | 4.1 | 13.7 | 6.4 | 10 | 2.2 |
| VN on granule |  | 109 | 88 | 103 | 94.4 | 124.6 |
| Starting material | VZ: specimen | 110 | 83.6 | 103.8 | 94.7 | 131.1 |
| 110° C. - storage in a controlled climate | 4 days | 63.3 | 53.5 | 80.1 | 94.3 | 70.9 |
| 110° C. - storage in a controlled climate | 8 days | 32.5 | 32.2 | 51.8 | 54.6 | 60.1 |
| Mechanical properties without storage | | | | | | |
| Tensile stress at break | (N/mm) | 145.3 | 152.2 | 155.6 | 160.6 | 148.1 |
| Tensile stress at yield | (N/mm) | 144.4 | 152.2 | 155.1 | 160.6 | 147.4 |
| Tensile strain | (%) | 3.4/3.2 | 2.9 | 2.8 | 2.8 | 3.4/3.2 |
| Modulus of elasticity | (N/mm) | 9990 | 10242 | 10391 | 10617 | 10139 |
| Impact resistance +23° C. | (kJ/m²) | 77.3 | 67.8 | 75.1 | 73.4 | 77 |
| Notched impact resistance | (kJ/m²) | 9.9 | 8.3 | 10 | 9.2 | 13 |
| Mechanical properties, storage conditions: 4 days at 110° C., 100% rel. hum. | | | | | | |
| Tensile stress at break | (N/mm) | 95.1 | 86.2 | 122.8 | 115.8 | 119.2 |
| Tensile strain | (%) | 1.7 | 1.5 | 2 | 1.6 | 2 |
| Modulus of elasticity | (N/mm) | 9005 | 9090 | 9418 | 9573 | 9171 |
| Impact resistance | (kJ/m²) | 20.5 | 22.4 | 32.2 | 27.6 | 41.1 |
| Mechanical properties, storage conditions: 8 days at 110° C., 100% rel. hum. | | | | | | |
| Tensile stress at break | (N/mm) | 30.4 | 32.5 | 61.9 | 54.4 | 61.9 |
| Tensile strain | (%) | 0.5 | 0.5 | 0.8 | 0.7 | 0.8 |
| Modulus of elasticity | (N/mm) | 7061 | 7359 | 9416 | 9528 | 9244 |
| Impact resistance | (kJ/m²) | 4.2 | 5 | 9 | 9.1 | 8.6 |

What is claimed is:

1. A thermoplastic molding composition comprising

A) from 10 to 98.9% by weight of at least one thermoplastic polyester,

B) from 0.01 to 20% by weight of

B1) at least one hyperbranched polycarbonate having an OH number of from 1 to 600 mg KOH/g of polycar- 6. The thermoplastic molding composition according to claim 1, in which the ratio of components B1):B2) is from 1:20 to 20:1.

7. The thermoplastic molding composition according to claim 1, in which component C) has a catalyst content of from 0.1 to 200 ppm.

8. The thermoplastic molding composition according to claim 1, in which component C) is a carbodiimide which is based on 2,4'-MDI and may comprise up to 60 mol % of units of other isocyanates.

9. The thermoplastic molding composition according to claim 1, in which component B1) has a viscosity (mPas) at 23° C. (to DIN 53019) of from 50 to 200 000.

10. The thermoplastic molding composition according to claim 9, in which component B2) has a number-average molecular weight $M_n$ of from 300 to 30 000 g/mol.

11. The thermoplastic molding composition according to claim 1, in which component B1) has a number-average molecular weight $M_n$ of from 100 to 15 000 g/mol.

12. The thermoplastic molding composition according to claim 11, in which component B1) has a viscosity (mPas) at 23° C. (to DIN 53019) of from 50 to 200 000.

13. The thermoplastic molding composition according to claim 2, in which component B2) has a number-average molecular weight $M_n$ of from 300 to 30 000 g/mol.

14. A method for producing fibers, films and moldings comprising utilizing the thermoplastic molding composition of claim 1 in the production of fibers, films and moldings.

15. A fiber, film or molding of any type, obtainable from the thermoplastic molding compositions according to claim 1.

* * * * *